(12) United States Patent
Sabol et al.

(10) Patent No.: US 11,042,478 B2
(45) Date of Patent: Jun. 22, 2021

(54) MANAGING STORAGE DEVICES (71) Applicant: Google LLC, Mountain View, CA (US)

(72) Inventors: Christopher J. Sabol, San Jose, CA (US); Tomasz Jeznach, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/937,161

(22) Filed: Mar. 27, 2018

(65) Prior Publication Data
US 2018/0285257 A1 Oct. 4, 2018

Related U.S. Application Data

(63) Continuation of application No. 14/311,920, filed on Jun. 23, 2014, now Pat. No. 9,959,203.

(51) Int. Cl.
*G06F 12/02* (2006.01)
*G06F 3/06* (2006.01)
(Continued)

(52) U.S. Cl.
CPC ........ *G06F 12/0246* (2013.01); *G06F 3/0604* (2013.01); *G06F 3/0647* (2013.01);
(Continued)

(58) Field of Classification Search
CPC ....... G06F 3/0646–0647; G06F 3/0604; G06F 3/0659; G06F 3/0679; G06F 3/0617;
(Continued)

(56) References Cited

U.S. PATENT DOCUMENTS 6,148,354 A 11/2000 Ban
6,910,205 B2 6/2005 Bak
(Continued)

FOREIGN PATENT DOCUMENTS

CN 1377481 A 10/2002
CN 104583977 A 4/2015
(Continued)

OTHER PUBLICATIONS

Ashish Batwara, "Leveraging host based Flash Translation Layer for Application Acceleration", Aug. 22, 2012, Flash Memory Summit, 2012, slides 1-30 https://www.flashmemorysummit.com/English/Collaterals/Proceedings/2012/Proceedings_Chrono_2012.html (Year: 2012).*
(Continued)

*Primary Examiner* — Reginald G Bragdon
*Assistant Examiner* — Curtis James Kortman
(74) *Attorney, Agent, or Firm* — Fish & Richardson P.C.

(57) ABSTRACT

Methods, systems, and apparatus, including computer programs encoded on a computer storage medium, for managing storage devices. In some implementations, a memory controller receives a logical write request over a logical interface that the memory controller provides for accessing a non-volatile storage device. The logical write request indicates a logical address at which to write data to the non-volatile storage device. In response to receiving the logical write request, the memory controller sends a write request event to a host system. The memory controller receives a physical write command from the host system over a physical interface that the memory controller provides for accessing the non-volatile storage device. In response to receiving the physical write command, the memory controller stores the data in the non-volatile storage device according to the physical write command.

17 Claims, 6 Drawing Sheets

(51) Int. Cl.
    *G06F 13/16*     (2006.01)
    *G06F 12/08*     (2016.01)

(52) U.S. Cl.
    CPC .......... *G06F 3/0659* (2013.01); *G06F 3/0679* (2013.01); *G06F 12/08* (2013.01); *G06F 13/1668* (2013.01); *G06F 2003/0697* (2013.01); *G06F 2212/7202* (2013.01); *G06F 2212/7207* (2013.01); *H05K 999/99* (2013.01)

(58) Field of Classification Search
    CPC .... G06F 3/0688; G06F 12/0246; G06F 12/08; G06F 2212/7202; G06F 2212/7207; G06F 13/1668; G06F 3/0647
    See application file for complete search history.

(56) References Cited

U.S. PATENT DOCUMENTS

| | | | |
|---|---|---|---|
| 7,480,761 B2 | 1/2009 | Birrell | |
| 8,191,063 B2 | 5/2012 | Singai | |
| 8,291,295 B2 | 10/2012 | Harari | |
| 8,321,652 B2 | 11/2012 | Hinz | |
| 8,411,702 B2 | 4/2013 | Zhou | |
| 8,463,825 B1 | 6/2013 | Harty | |
| 8,499,114 B1 | 7/2013 | Vincent | |
| 8,554,963 B1 | 10/2013 | Shapiro | |
| 8,554,968 B1 | 10/2013 | Onufryk | |
| 8,566,502 B2 | 10/2013 | Vaghani | |
| 8,615,621 B2 | 12/2013 | Van | |
| 8,645,665 B1 | 2/2014 | Bennett | |
| 8,656,388 B2 | 2/2014 | Chou | |
| 8,671,256 B2 | 3/2014 | Dow | |
| 8,688,953 B2 | 4/2014 | Frank | |
| 8,751,738 B2 * | 6/2014 | Green | G06F 3/0617 711/112 |
| 9,053,007 B2 * | 6/2015 | Nishikubo | G06F 12/0246 |
| 2006/0039196 A1 | 2/2006 | Gorobets et al. | |
| 2008/0046641 A1 | 2/2008 | Lasser | |
| 2009/0037679 A1 | 2/2009 | Kaushiik et al. | |
| 2009/0043979 A1 | 2/2009 | Jarvis | |
| 2009/0119685 A1 * | 5/2009 | Phelan | G06F 9/45558 719/324 |
| 2009/0234989 A1 | 9/2009 | Fischer | |
| 2009/0327589 A1 | 12/2009 | Moshayedi | |
| 2010/0115190 A1 * | 5/2010 | Cho | G06F 12/0246 711/103 |
| 2010/0153672 A1 | 6/2010 | Jogand-Coulomb et al. | |
| 2010/0174851 A1 | 7/2010 | Leibowtiz | |
| 2010/0250836 A1 | 9/2010 | Sokolov et al. | |
| 2010/0257328 A1 | 10/2010 | Liu | |
| 2011/0093679 A1 * | 4/2011 | Cyr | G06F 3/0607 711/170 |
| 2011/0154318 A1 | 6/2011 | Oshins | |
| 2012/0005404 A1 | 1/2012 | Raz et al. | |
| 2012/0017031 A1 | 1/2012 | Mashtizadeh et al. | |
| 2012/0239853 A1 | 9/2012 | Moshayedi | |
| 2013/0041977 A1 * | 2/2013 | Wakamiya | G06F 9/5077 709/217 |
| 2013/0042052 A1 | 2/2013 | Colgrove | |
| 2013/0086311 A1 | 4/2013 | Huang | |
| 2013/0298122 A1 | 11/2013 | Rangegowda | |
| 2014/0059270 A1 | 2/2014 | Zaltsman | |
| 2014/0068158 A1 | 3/2014 | Cheng | |
| 2014/0181365 A1 | 6/2014 | Fanning et al. | |
| 2014/0215129 A1 * | 7/2014 | Kuzmin | G06F 12/0246 711/103 |
| 2014/0229761 A1 * | 8/2014 | Okubo | G06F 11/1048 714/6.11 |
| 2015/0081993 A1 * | 3/2015 | Christopher | G06F 11/1451 711/162 |

FOREIGN PATENT DOCUMENTS

| | | |
|---|---|---|
| EP | 2437167 | 4/2012 |
| WO | WO 0123987 | 4/2001 |
| WO | WO2008023368 | 6/2008 |
| WO | WO2013006801 | 1/2013 |
| WO | WO2013048451 | 4/2013 |
| WO | WO2014055445 | 4/2014 |

OTHER PUBLICATIONS

VirtualBox, Chaper 5. Virtual Storage, Jan. 5, 2012, VirtualBox, retrieved from the Internet Archive Jan. 5, 2012, pp. 1-11 http://web.archive.org/web/20120105025856/https://www.virtualbox.org/manual/ch05.html (Year: 2012).*
Wei Huang et al., "High Performance Virtual Machine Migration with RDMA over Modern Interconnects", Sep. 2007, IEEE, Cluster'07: Proceedings of the 2007 IEEE International Conference on Cluster Computing, pp. 1-10 (Year: 2007).*
CN Office Action issued in Chinese Application No. 201580033733.8, dated Jan. 9, 2019, 24 pages (with English translation).
International Preliminary Report on Patentability and Written Report in International Application No. PCT/US2015/036470, dated Jan. 5, 2017, 11 pages.
International Search Report and Written Opinion in International Application No. PCT/US2015/036470, dated Dec. 4, 2015, 17 pages.
Invitation to Pay Additional Fees and, Where Applicable, Protest Fee received in International Application No. PCT/US2015/036470, dated Oct. 12, 2015, 5 pages.
NVM Express, Revision 1.0e, Jan. 23, 2013, Intel Corporation, 127 pages.
EP Extended Search Report in European Application No. 19212144, dated Feb. 17, 2020, 8 pages.

* cited by examiner

MANAGING STORAGE DEVICES

CROSS-REFERENCE TO RELATED APPLICATIONS

This application is a continuation of U.S. application Ser. No. 14/311,920, filed Jun. 23, 2014, the contents of which are incorporated by reference herein.

FIELD

This specification describes technologies related to managing storage devices.

BACKGROUND

Computers, phones, and other electronic devices often use non-volatile storage devices to store data. Typically, one or more subsystems manage access to the storage devices to allow data to be stored and retrieved.

SUMMARY

In some implementations, a solid-state drive or other storage device can interact with other devices using a logical interface as well as a physical interface. The logical interface may allow a connected device to read and write data according to a logical addressing scheme that abstracts away details about the physical configuration of the storage device. The physical interface may allow access to specific physical storage locations, for example, to allow reading, writing, or erasing of specific physical pages and blocks of NAND flash in a solid-state drive.

By providing both logical and physical interfaces, the storage device may provide access to data over the logical interface while relying on a host system to perform management tasks using the physical interface. For example, the memory controller of the storage device may offload some or all management functions to a host system in communication through the physical interface. When a logical request is received over the logical interface, the memory controller may provide an event to the host system as a notification of the logical request. The memory controller may then receive, from the host system over the physical interface, commands that direct the memory controller how to carry out the logical request. In this manner, the host system may specify, for example, which physical storage locations data should be written, and the host system may take responsibility for tasks such as garbage collection and wear leveling. The offloading of management tasks to the host system may be done transparently, so that the storage device appears to devices communicating over the logical interface to be a standard storage device. As a result, the logical interface may allow access to the storage device using standard flash drivers and command sets, such as non-volatile memory express (NVMe) or advanced host controller interface (AHCI) standards, while allowing customized management by the host system.

In some implementations, the storage device may permit a host system to enhance the process of migrating of data from one storage device to another. The host system may use various techniques to transfer a virtual machine's access from a source drive to a destination drive. As an example, a L2P mapping table of the destination drive may be populated with a code, e.g., an invalid physical address, to indicate the logical addresses for which data has not yet been copied to the destination drive. If a virtual machine requests access to data for a logical address that is mapped to the code, the destination drive, the host system, and the source drive may cooperate to provide the appropriate data from the source drive to fulfill the request. As another example, the host system may begin copying data from the source drive to the destination drive while the virtual machine retains access to the source drive. While migration occurs, the source drive provides information to the host system about write requests to the source drive. The host system may track the writes that occur and perform these writes to the destination drive, to ensure that the destination drive includes data that reflects writes that occur after migration begins.

In a general aspect, a method performed by one or more processing devices comprises: receiving, at a memory controller, a logical write request over a logical interface that the memory controller provides for accessing a non-volatile storage device, the logical write request indicating a logical address at which to write data to the non-volatile storage device; in response to receiving the logical write request, sending, by the memory controller, a write request event to a host system; receiving, at the memory controller, a physical write command from the host system over a physical interface that the memory controller provides for accessing the non-volatile storage device, the physical write command comprising instructions for writing the data to the non-volatile storage device; and in response to receiving the physical write command from the host system, storing, by the memory controller, the data in the non-volatile storage device according to the physical write command.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, sending the write request event includes sending a write request event indicating (i) a buffer address for a write buffer storing the data and (ii) the logical address indicated by the logical write request. Receiving the physical write command includes receiving a physical write command indicating (i) the write buffer address for the write buffer storing the data and (ii) one or more physical pages of the non-volatile storage device in which to store the data; and storing the data in the non-volatile storage device includes storing the data in the one or more physical pages of the non-volatile storage device that are indicated by the physical write command. Receiving, by the memory controller, the data corresponding to the logical write request. Sending the write request event to the host system over the physical interface includes sending the write request event to the host system without sending the data to the host system. Receiving the physical write command from the host system over the physical interface includes receiving the physical write command without receiving the data from the host system. Receiving the data includes receiving the data through a direct memory access (DMA) transfer from a system other than the host system. After storing the data in the non-volatile storage device: updating, by the memory controller, a logical-to-physical mapping table managed by the memory controller; and sending, by the memory controller, an acknowledgment of the write indicated by the logical write request.

Implementations may include one or more of the following features. For example, in response to receiving the logical write request, allocating, by the memory controller, a write buffer for storing the data. Storing, by the memory controller, the data in the allocated write buffer; and after storing the data in the non-volatile storage device, deallocating, by the memory controller, the write buffer storing the data. Allocating the write buffer includes allocating a write buffer in volatile memory. Providing an acknowledgement of the write indicated by the logical write request after storing the data in the allocated write buffer and before storing the data in the non-volatile storage devices. Receiving the logical write request over the logical interface includes receiving the logical write request over a non-volatile memory express (NVMe) interface or an advanced host controller interface (AHCI) interface. Receiving the physical write command from the host system over the physical interface includes receiving the physical write command over a peripheral component interconnect express (PCI-e) interface. Receiving the physical write command from the host system over the physical interface includes receiving the physical write command that indicates one or more physical NAND flash pages in which to write the data.

Advantageous implementations can include one or more of the following features. For example, a storage device can provide access through both a logical interface and a physical interface. Standardized logical interfaces may be provided while allowing customized management techniques. The processing requirements of a memory controller may be reduced. Management functions, such as garbage collection, wear leveling, and selection of physical areas to write data, may be offloaded to a host system. Write operations may be managed by a host system without transferring data to and from the host system. Virtual machine data can be migrated efficiently from one drive to another. Multiple data migration options can be supported.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
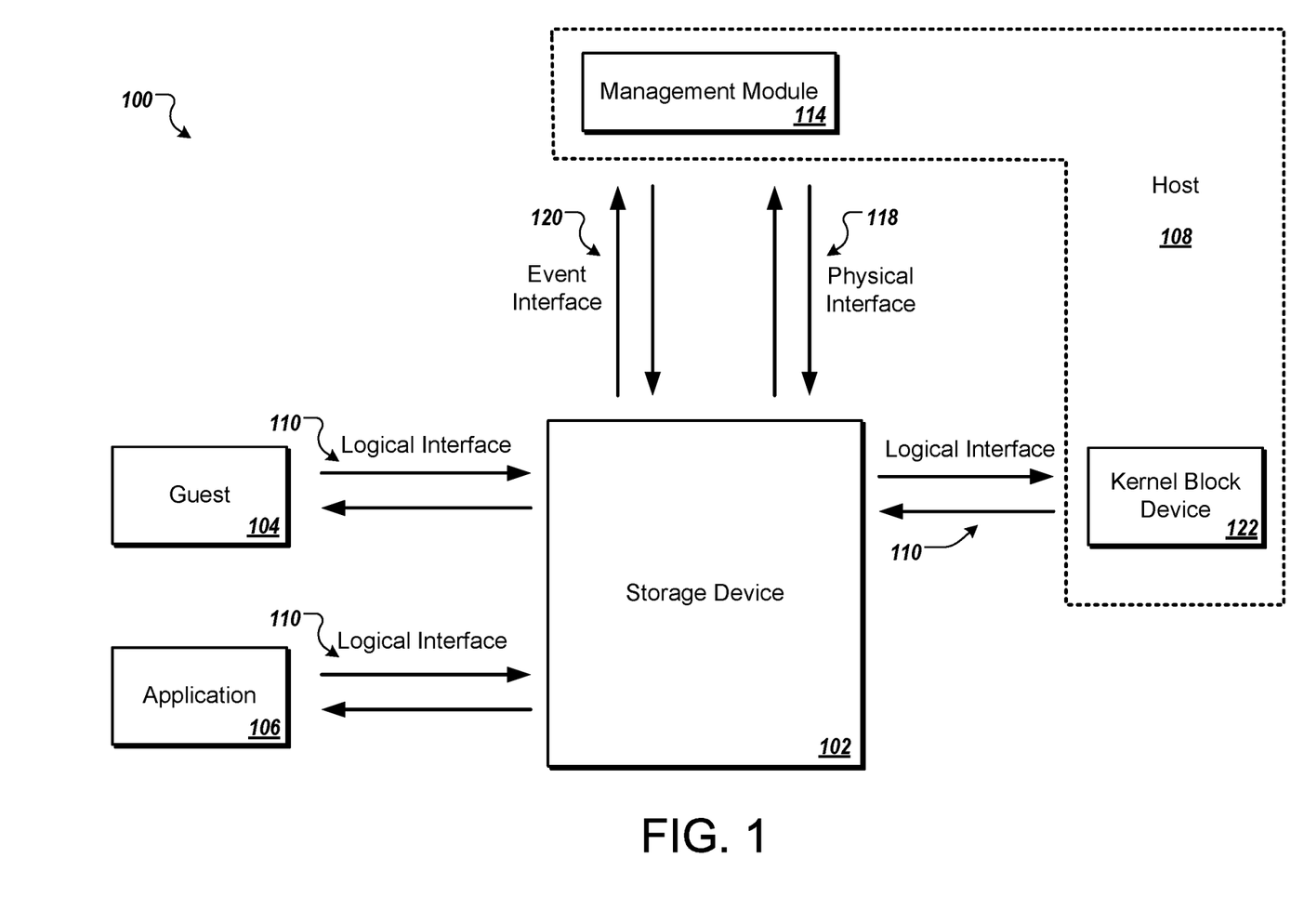
FIG. 1 is a block diagram that illustrates an example of a system for managing storage devices.

FIG. 1 is a block diagram that illustrates an example of a system 100 for managing storage devices. The system 100 includes a storage device 102, a host 108, a guest 104, and an application 106. The storage device 102 permits other devices to store and retrieve data from, for example, non-volatile memory in the storage device 102. The storage device 102 may be a solid-state drive (SSD) including NAND flash memory, or the storage device 102 may be another form of storage module. The host 108 is a computer system that manages the storage device 102. In some implementations, the host 108 is a virtualization server that provides processing and storage resources to one or more virtual machines or virtual environments. The guest 104 and the application 106 are examples of additional modules that may have access to the storage device 102. As described further below, the storage device 102 is configured to cooperate with the host 108 to perform data storage, data retrieval, maintenance tasks, and other management of the storage device 102.

The storage device 102 provides both a physical interface and a logical interface for access to memory. The physical interface provides access using physical addressing of the memory of the storage device 102. For example, each physical address in the physical address space may correspond to a specific storage location in memory. Generally, the assignment of the physical addresses to the actual data storage circuits in the memory does not change during use of the storage device 102. The logical interface provides access using logical addressing of the memory of the storage device 102. For example, a logical address may be an address where certain data appears to reside from the perspective of an executing program or external system, but the logical address does not permanently correspond to any particular memory circuit or storage location. As data is written to the storage device 102, logical addresses are mapped and remapped to different storage locations having different physical addresses. As described further below, the storage device 102 maintains a logical-to-physical mapping that indicates which physical addresses correspond to which logical addresses, and these mappings often change as the storage device 102 is used. In general, logical addressing abstracts details of where data is physically stored on memory devices, while physical addressing allows commands to refer specific physical storage locations of the memory devices.

The physical interface to the storage device 102 is provided through a physical interface 118. An event interface 120 is used with the physical interface to allow greater control of the storage device 102. The physical interface 118 and the event interface 120 allow customized management by the host 108 and allow the storage device 102 to offload many of a memory controller's typical functions to the host 108. Logical access to the storage device 102 is provided through a logical interface 110, which allows systems to communicate with the storage device 102 using standardized protocols. For example, the logical interface 110 may allow access using standards such as NVMe, AHCI, single root I/O virtualization (SR-IOV), and/or other communication methods. To systems that access the storage device 102 using the logical interface 110, the storage device 102 appears to be a standard drive, even though the host 108 provides custom management for the storage device 102.

The logical interface 110, the event interface 120, and the physical interface 118 may each be implemented as a queue pair, e.g., a bidirectional interface including an input queue for incoming messages received at the storage device 102 and an output queue for outgoing messages sent by the storage device 102. For example, in one queue of the physical interface 118, the storage device 102 may receive commands that refer to specific physical pages or blocks of memory devices. In the other queue of the physical interface 118, the storage device 102 may provide acknowledgements, error messages, data, or other information.

The host 108 includes a management module 114 that controls and performs maintenance of the storage device 102. The management module 114 may be a kernel driver, application, or other software module running on the host 108. The management module 114 communicates with the storage device 102 using the event interface 120 and the physical interface 118. In some implementations, the physical interface 118 and the event interface 120 are implemented using a peripheral component interconnect express (PCIe) connection to the host 108.

The storage device 102 sends events to the management module 114 over the event interface 120, for example, to notify the host 108 actions or conditions that require input from the host 108. The storage device 102 may send a read event to indicate receipt of a request to read data from the storage device 102, and may send a write event to indicate a request to write data to the storage device 102.

The management module 114 sends commands to the storage device 102 and receives confirmations from the storage device 102 using the physical interface 118. The commands that the management module 114 provides over the physical interface 118 use physical addressing to refer to specific, physical data storage locations in the memory of the storage device 102. Examples of commands that the management module 114 may provide include, for example, read commands, write commands, copy commands, and erase commands. The commands may specify operations relating to particular pages or blocks of memory. As examples, one command may request that data be written to particular physical pages, and another command may request that a particular physical block be erased.

As discussed above, the physical interface 118 may be implemented as a queue pair, for example, a request queue for the management module 114 to send commands and a completion queue for the storage device 102 to send operation completion notifications. The commands are instructions that indicate which operations the storage device 102 should perform. Some of the commands can result in data transfer to or from the storage device 102. Data transfer typically does not occur directly over the queue pair, but occurs through a bulk DMA operation instead. For example, a physical read command may provide a buffer pointer to the host memory, e.g., host DRAM. The storage device 102 may transfer the requested data via bulk DMA to the buffer indicated by the pointer, and then send a completion notification over the completion queue to indicate completion of the operation.

The physical interface 118 may allow commands to: (1) write the contents of a buffer to a physical address, (2) copy data at a first physical address to a second physical address, and (3) erase data at a physical address. Generally these three commands would not result in a DMA data transfer between the host 108 and the storage device 102. By using the copy operation, the management module 114 may perform garbage collection without transferring data off the storage device 102. As indicated above, the physical interface 118 may also include commands to erase data at certain physical addresses.

For debugging, completeness, and legacy support reasons, the physical interface 118 may also support commands to read data at a physical address, write data to a buffer, and other debugging related commands. The commands to read data from a physical address and write data to buffer would typically result in a bulk DMA operation by the storage device 102.

Various devices and modules can access data storage through the logical interface 110 provided by the storage device 102. Access to the storage device 102 over the logical interface 110 may occur simultaneously with access over the physical interface 118. That is, the host 108 is connected to the storage device 102 at the same time that one or more other systems are connected through the logical interface 110.

The logical interface 110 may allow command operations including read, write, and trim. The trim command may be used, for example, to indicate that an address is available to be erased or reclaimed through garbage collection. The logical interface 110 may also allow other operations, for example, such as NVMe housekeeping operations to create and destroy logical queue pairs, and so on.

Examples of systems that communicate over the logical interface 110 include the guest 104, the application 106, and a kernel block device 122. The described 104 represents a guest operating system, e.g., an operating system running in a virtual environment managed by the host 108. The application 106 may be an application that has access to the logical interface 110, either directly or through a virtualized connection. The kernel block device 122 represents a driver module of the host 108, showing that the host 108 may also store and retrieve data through the logical interface 110 using standard storage device drivers and protocols. For example, although the host 108 manages the storage device 102 using the physical interface 118, the operating system of the host 108 may additionally access the storage device 102 to support the kernel file system of the host 108.

The normal runtime operations performed by the host's management module 114 over the physical interface 118 generally will not result in any data transfer or bulk DMA operations. The applications and other systems that interact with the storage device 102 using the logical interface 110 generally initiate data transfers. Logical read and write operations typically result in DMA transfers to and from the storage device 102. As discussed further below, the storage device 112 provides the management module 114 with notification of logical write requests, as well as the buffer IDs for buffers in which data has already been transferred through bulk DMA. To complete a logical write, the management module 114 may issue, over the physical interface 118, a command for the storage device 102 to write the contents of the appropriate buffer to a specified physical address. This command may cause the storage device 102 to take the data already within the storage device's 102 buffers and store it in flash memory.

In addition to the queue pairs illustrated, the logical interface 110 and the physical interface 118 each have an implicit ability to access at least some memory addresses of the host 108 provided using a bulk DMA mechanism. As a result, the storage device 102 can, for example, perform a bulk DMA transfer of data from an application or virtual machine, outside of the queue pairs of the logical interface 110. Bulk DMA data transfers and queue pairs may operate using the same hardware link, such as a PCIe interface with the host 108. In addition, the commands and completions notifications sent through queue pairs, as well as bulk DMA data transfers, may be performed as DMA operations that directly read or write to system DRAM.

Typically, each guest virtual machine or application has access to only a subset of host DRAM. PCIe virtualization may use an input/output memory unit (IO-MMU), implemented in system hardware, to limit DMA transfers on behalf of an application or virtual machine to the portions of host DRAM that they own. To implement these controls, logical queues pairs may be associated with a PCIe virtual function. Each DMA operation issued on behalf of a logical queue pair may be tagged with that queue pair's virtual function. When host hardware is processing device DMA operations, both for bulk DMA transfer and queue access operations, the IO-MMU hardware uses the virtual function of the DMA to consult a virtual-function-specific address mapping and permission table to determine if the DMA operation is valid for the application and/or virtual machine. By contrast, the physical queue pair is not restricted to a virtual function. As a result, DMA operations issued to process commands on the physical queue pair have access to all of host DRAM.

Figure 2:
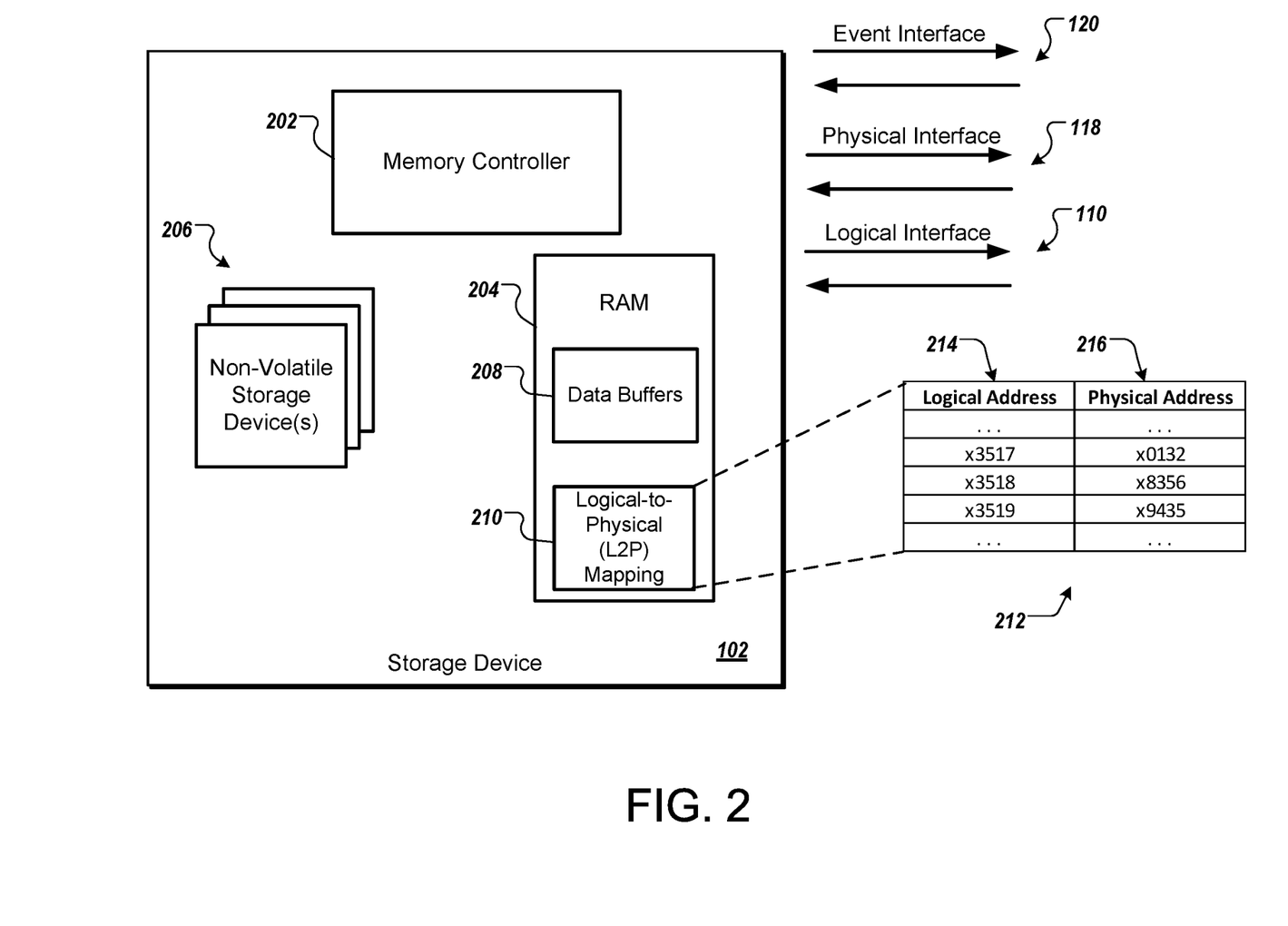
FIG. 2 is a block diagram that illustrates an example of a storage device.

FIG. 2 is a block diagram that illustrates an example of a storage device 102. The storage device 102 may include, for example, a memory controller 202, random access memory (RAM) 204, and non-volatile storage device(s) 206.

The memory controller 202 may include one or more processors that are configured to process data from the various interfaces 110, 118, 120 of the storage device 102, and to perform other functions as described further below. The functions of the memory controller 202 may be implemented using hardware, firmware, software, or a combination thereof.

The non-volatile storage device(s) 206 may be NAND flash chips or other data storage components. Typically, the storage device 102 includes multiple non-volatile storage device(s) 206, and the memory controller 202 includes multiple channels to access multiple non-volatile storage device(s) 206 in parallel.

The RAM 204 may include volatile dynamic random access memory (DRAM), which may be used to store data buffers 208 and a logical-to-physical (L2P) mapping 210. For example, the memory controller 202 may allocate portions of the RAM 204 to serve as data buffers 208 for temporary storage of data received over the logical interface 110, before the data is written to non-volatile storage.

The L2P mapping 210 provides a mapping between logical addresses, e.g., addresses used by external application or operating system to represent storage locations, and physical addresses, e.g., addresses for the physical regions of the non-volatile storage device(s) 206 where the data is actually stored. For example, the L2P mapping 210 may be implemented as a table 212 that maps logical addresses 214 to physical addresses 216. In the illustrated example, logical address "x3517" corresponds to physical address "x0132," logical address "x3518" corresponds to physical address "x8356," and logical address "x3519" corresponds to physical address "x9435."

Figure 3:
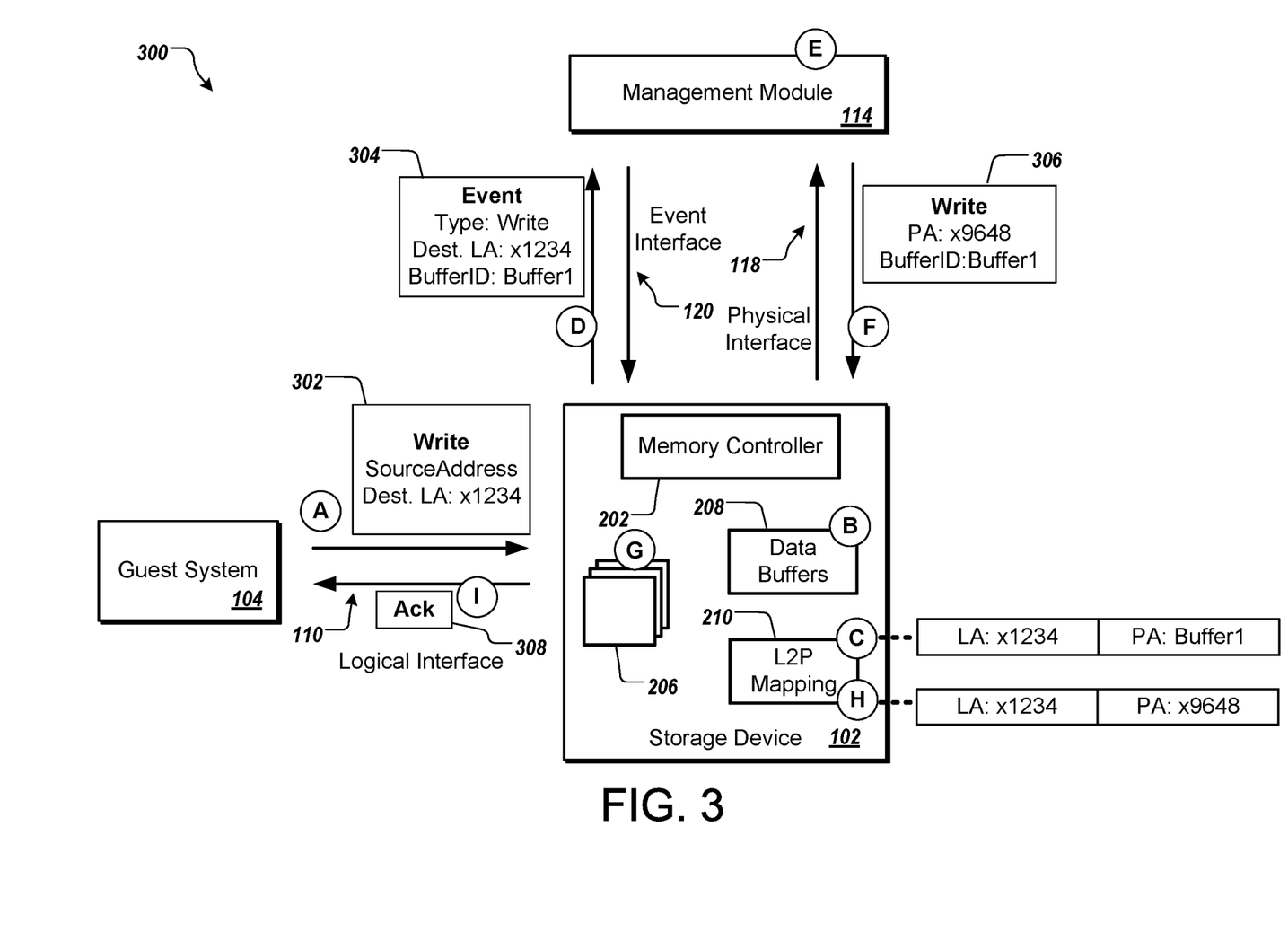
FIG. 3 is a block diagram that illustrates an example of a system for managing storage devices.

FIG. 3 is a block diagram that illustrates a system 300 for managing storage devices. FIG. 3 illustrates interactions of the storage device 102, the guest 104, and the management module 114 of FIG. 1. FIG. 3 also illustrates a flow of data, indicated by stages (A) through (I). The example of FIG. 3 illustrates an example of how the hybrid design of the storage device 102 allows communication over the logical interface 110 as well as the physical interface 118. In the example, the storage device 102 provides the logical interface 110 to the guest 104 (e.g., a guest operating system in a virtual machine) while also providing a physical interface to a host 108.

In the example of FIG. 3, the guest 104 initiates a write operation using the logical interface 110. The storage device 102 and the host 108 interact to carry out the write operation, with the management module 114 designating the physical location(s) of the storage device 102 where the data is stored. The interactions of the storage device 102 and the host 108 allow the host 108 to manage the write operation without transferring data to be written between the storage device 102 and the host 108.

During stage (A), the guest 104 sends a logical write request 302 to the storage device 102 over the logical interface 110. The logical write request 302 indicates a logical address at which to write data to the non-volatile storage device(s) 206. In the illustrated example, the logical write request 302 indicates that data should be stored at a destination logical address of "x1234." The logical write request 302 also indicates a source address, e.g., "SourceAddress" from which the data to be written can be accessed.

During stage (B), in response to receiving the logical write request 302, the memory controller 202 allocates a data buffer 208 to store the data associated with the logical write request 320, e.g., the data that the guest 104 requests to be written. The data buffer 208 may be located in volatile memory, such as the RAM 204 shown in FIG. 2. After allocating the data buffer 208, the memory controller 202 transfers the data to be written to the data buffer 208. For example, the memory controller 202 transfers the data to the data buffer 208 via a direct memory access (DMA) transfer from the guest 104.

During stage (C), the memory controller 202 updates the L2P mapping 210 so that the logical address indicated by the write request 302 corresponds to (e.g., maps to) the data buffer 208 storing the data from the guest 104. In the illustrated example, the L2P mapping 210 is updated so that, for the logical address "x1234," the corresponding physical address is indicated to be the data buffer 208, e.g., "Buffer1."

In some implementations, after storing the data from the guest 104 in the data buffer 208, the memory controller 202 can optionally provide an acknowledgement to the guest 104 indicating that the write operation has been completed. If the guest 104 attempts to read data from the logical address "x1234" before the write to non-volatile storage is complete, the memory controller 202 can provide the data from the data buffer 208 that stores the data. However, since the data is currently stored in volatile RAM 204, the data is not persistent in the event of loss of power to the storage device 102.

During stage (D), in response to receiving the logical write request 302, the memory controller 202 sends a write request event 304 to the management module 114 over the event interface 120. The write request event 304 notifies the management module 114 that a write operation has been requested. Since the management of writes is handled by the management module 114, the write request event 304 signals to the management module that input is needed to complete the write operation. The write request event 304 indicates a type of operation (e.g., a write operation), a logical address associated with the operation (e.g., "x1234"), and a buffer identifier for the data buffer 208 that stores the data to be written (e.g., "Buffer1"). The write request event 304 may include any or all of the information in the write request 302. The memory controller 202 provides the write request event 304 to the management module 114 without sending the data to be written, e.g., the data stored in the data buffers 208, to the management module 114.

The logical write request 302 and/or the write request event 304 may indicate a size for the write request, e.g., an amount of data to be written. For example, this information may be provided through an NVMe interface. In some implementation, write buffers have of fixed size (e.g., 4 kilobytes). As a result, for a write having a size that is of the fixed size or less, the memory controller 202 may send a single write request event 304 to the management module 114. When a guest system requests a logical write that is larger than the fixed write buffer size, the memory controller 202 allocates multiple write buffers for the data and the memory controller 202 sends multiple write request events 304 to the management module 114. If a fixed size is used for all write events from the memory controller 202, then the write request events 304 may omit an indication of the size of data to be written, since both the memory controller 202 and the management module 114 know in advance that the event represents a write having the fixed size. In some implementations, variable sized write buffers are used, so that a logical write from the guest system 104 always results in the memory controller 202 sending a single write request event 304 to the host management module 114. The write request event 304 may indicate the particular size of the buffer storing data associated with the write request event 304.

During stage (E), in response to receiving the write request event 304, the management module 114 identifies storage locations of the non-volatile storage device(s) 206 where the data from the guest 104 should be stored. For example, the management module 114 may identify specific physical pages of the non-volatile storage device(s) 206 where the data should be written. For example, the management module 114 can identify physical pages that represent free space, e.g., previously erased memory locations. The management module 114 may perform other actions to select storage locations, such as determining whether garbage collection is needed, performing wear leveling analysis, and so on. Once the management module 114 has identified the storage locations that should be used for the write operation, the management module 114 sends the information to the memory controller 202 in a physical write command.

In addition to sending the physical write command 306, the management module 114 may send other commands. For example, the management module may instruct the memory controller to erase certain blocks, copy data from one location to another, or otherwise prepare the non-volatile storage device(s) 206 to perform the write indicated in the physical write command 306.

During stage (F), the memory controller 202 receives the physical write command 306 from the management module 114 over the physical interface 118. The physical write command 306 includes instructions to write the data in the data buffer 208 to the non-volatile storage device(s) 206. The physical write command 306 indicates (i) the buffer address for the data buffer 208 storing the data to be written and (ii) one or more physical addresses (abbreviated as "PA" in the figure) of the non-volatile storage device(s) 206 in which to store the data. The one or more physical addresses may indicate specific pages or blocks of the non-volatile storage device(s) 206. The physical write command 306 may also indicate the logical address associated with the write, or the memory controller 202 may determine the logical address (e.g., based on the buffer identified and the address indicated in the corresponding logical write request 302).

In the illustrated example, the physical write command 306 indicates a buffer identifier of "Buffer1," and indicates that the data in the buffer should be written to the storage location having physical address "x9648." Since the memory controller 202 already stores the data to be written in the data buffer 208, the memory controller 202 has no need to transfer the data again.

During stage (G), the memory controller 202 stores the data in the data buffer 208 in the non-volatile storage device(s) 206, at the storage locations (e.g., pages) indicated by the physical address(es) in the physical write command 306. In the illustrated example, the memory controller 202 stores data from the data buffer 208 designated "Buffer1" in the non-volatile storage device(s) 206 at a physical address of "x9648," as indicated by the physical write command 306.

At stage (H), the memory controller 202 updates the L2P mapping 210 to indicate that the logical address indicated by the logical write request 302 corresponds to the physical address where the data is actually stored in the non-volatile storage device(s) 206. In the illustrated example, the memory controller 202 updates the L2P mapping 210 to indicate that the logical address of "x1234," as indicated by the logical write request 302, corresponds to the physical address of "x9648," as indicated by the physical write command 306. After completing the write operation to non-volatile storage, the memory controller 202 deallocates (e.g., clears and frees) the data buffer 208.

At stage (I), if the memory controller 202 has not yet indicated completion of the write to the guest 104, the memory controller 202 sends an acknowledgement 308 to the guest 104 indicating that the data is stored by the non-volatile storage device(s) 206.

In addition to the example of the write operation shown in FIG. 3, the storage device 102 may carry out read operations initiated by the guest 104 using the logical interface 110. In some implementations, the storage device 102 may provide data in response to a read request without interaction with the management module 114 of the host 108.

A logical read request may indicate a logical address from which data should be read from the one or more non-volatile storage device(s) 206. A logical read request may also indicate a destination address of the guest 104 where the data associated with the read request should be transferred. The memory controller 202 receives the read request from the guest 104, and in response, accesses the L2P mapping 210. The memory controller 202 can identify the logical address indicated by the read request within the L2P mapping 210 and determine a physical address associated with (e.g., mapped to) the identified logical address.

The memory controller 202 can retrieve the data associated with the determined physical address (e.g., as stored by the non-volatile storage device(s) 206). The memory controller 202 provides the retrieved data to the destination address of the guest 104 (e.g., via DMA) as indicated by the read request from the guest 104. The memory controller 202 may also provide an acknowledgement to the guest 104 that the read operation associated with the retrieved data is complete. Thus, in some instances, the memory controller 202 directly provides access to the data stored by the non-volatile storage device(s) 206 in response to a read request from the guest 104, without involvement or assistance by the management module 114.

Figure 4:
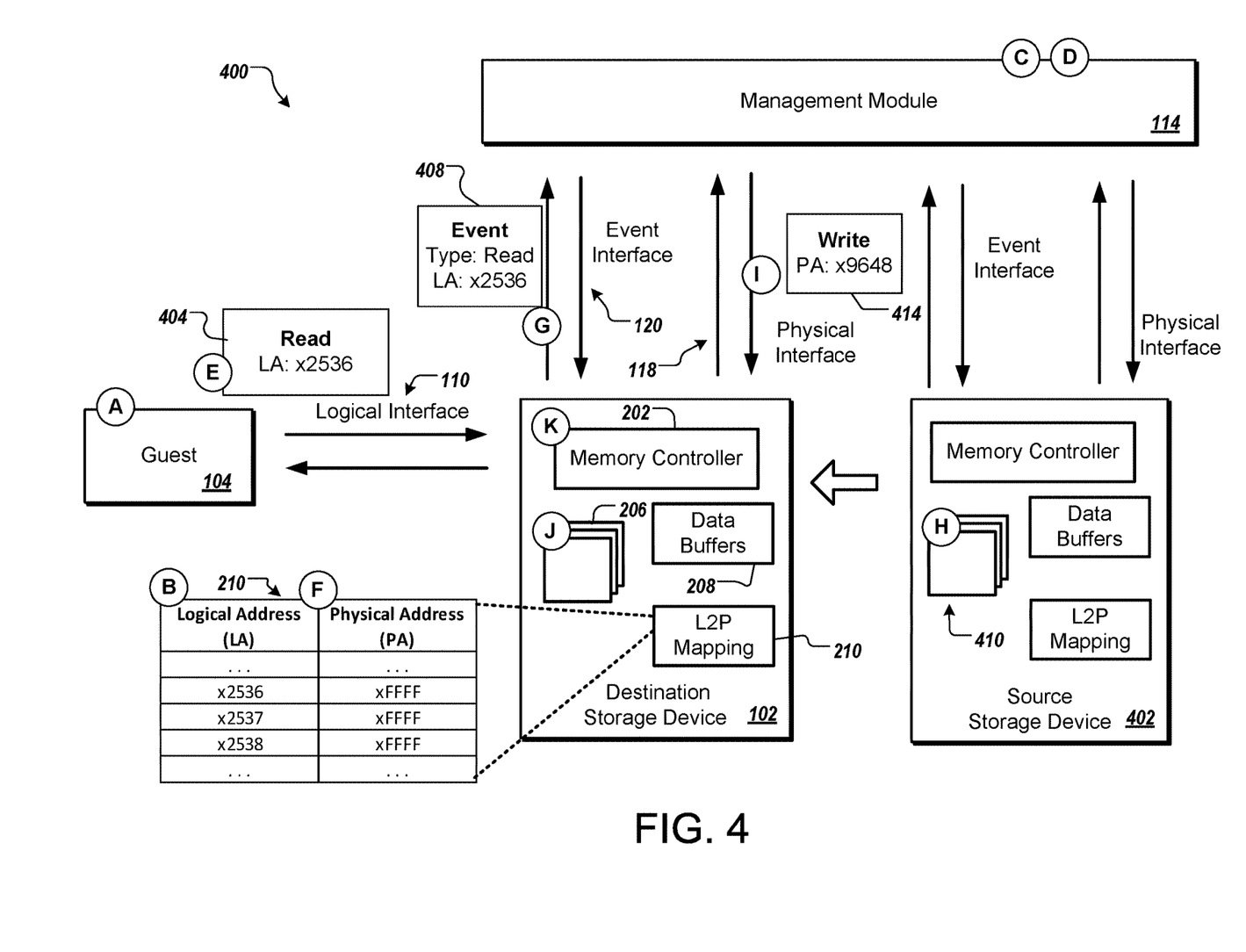
FIGS. 4 and 5 are block diagrams that illustrate examples of migrating data between storage devices.

FIG. 4 is a block diagram that illustrates a system 400 for migrating data between storage devices. The system 400 includes a source storage device 402 and the storage device 102, referred to as a destination storage device 102. The source storage device 402 and the destination storage device 102 are both managed by the management module 114. The system also includes the guest 104, which initially accesses the source storage device 402. The management module 114 transitions the guest 104 from using the source storage device 402 to using the destination storage device 102, while allowing read and write access of the guest 104 during most of the migration process.

In the example of FIG. 4, the management module 114 transfers the guest's 104 access to the destination storage device 102 before migration is complete, e.g., before the destination storage device 102 includes a complete copy of the data on the source storage device 402. As a result, there is a possibility that the guest 104 may request a read from a logical address of the destination storage device 102 when the destination storage device 102 does not yet store the data that the guest 104 attempts to read. To deal with this scenario, the destination storage device 102 stores a code in the L2P mapping 210 that indicates logical addresses that have not yet been migrated. When the destination storage device 102 determines that a read operation is requested for a logical address associated with the code, the storage devices 402, 102 and the management module 114 interact to provide the appropriate data from the source storage device 402.

In further detail, during stage (A), the guest 104 initially accesses the source storage device 402. The guest 104 may send read requests for data stored by the source storage device 402, receive data from the source storage device 402, and send write requests of data to be stored by the source storage device 402.

During stage (B), the management module 114 prepares the destination storage device 102 in order to transition access by the guest 104 from the source storage device 402 to the designation storage device 102. The management module 114 modifies the L2P mapping 210 of the destination storage device 102 (or issues commands for the destination storage device 102 to do so) such that each logical address in the L2P mapping 210 is associated with a particular code. The code may be, for example, a reserved value, flag, or invalid physical address that indicates that the data associated with the logical address is invalid. For example, the code can be a physical address that does not correspond to any storage location of the one or more non-volatile storage device(s) 206. As a result, a read request that attempts to read the data from a logical address mapped to the code can prompt the memory controller 202 to generate an event or error.

In the illustrated example, the physical address value for each logical address of the destination storage device 102 is set to "xFFFF," or negative 1, which is not a valid physical address. The invalid address may be one of multiple different invalid addresses that are used to trigger different actions or events by the memory controller 202 when a read is attempted. In addition to or as an alternative to storing a code in a physical address field of the L2P mapping 210, a code may be stored as a flag or other value stored in addition to a physical address, or a code stored in another manner.

During stage (C), the management module 114 suspends the virtual environment for the guest 104 and discontinues access to the source storage device 402 by the guest 104.

During stage (D), the management module 114 resumes the virtual environment for the guest 104 and provides the guest 104 access to the destination storage device 102, e.g., over the logical interface 110 of the destination storage device 102. From the perspective of the guest 104, there is no indication that one storage device has been substituted for another. The guest 104 may continue to issue logical read and write requests to the destination storage device 102 as if the source storage device 402 were still connected.

After the transition to the destination storage device 102, write requests from the guest 104 are directed to the destination storage device 102. Write operations may be performed in the same manner described above with respect to FIG. 3. The process of carrying out a write operation to the destination storage device 102 involves writing a physical address to the L2P mapping 210. Therefore, any writes to the destination storage device 102 will clear the code, e.g., "xFFFF," that indicates that the associated data is invalid. Subsequent reads from these addresses may be performed by the destination storage device in the normal manner. In addition, the process of writing data to the destination storage device 102 involves notifying the management module 114 of the write, using a write request event as shown in FIG. 3. This allows the management module 114 to determine that the data being written to the destination storage device 102 is more current than the data not yet migrated from the source storage device 402, so that the management module 114 can avoid overwriting current data in the destination storage device 102 with outdated data from the source storage device 402.

At some point, before or after stage (D), the management module 114 may initiate migration of data stored by the source storage device 402 to the destination storage device 102. For example, the management module 114 may issue commands causing data to be copied from the source storage device 402 to the destination storage device 102. In some instances, the data is transferred from the source storage device 402 to the destination storage device 102 over a network. In some instances, if the storage devices 402, 102 are directly attached to the same host system, data may be transferred from the source storage device 402 to the destination storage device 102 without transfer over a network.

The copying causes the L2P mapping 210 of the destination storage device 102 to be updated, so that the logical addresses of the destination storage device 102 and the source storage device 402 map to locations storing the same data. The physical addresses corresponding to a logical address need not be the same in the different L2P mappings, as long as the physical addresses correspond to locations storing the same data. As an example, a logical address of "x1234" may map to a physical address of "x3745" in the source storage device 402, and a physical address of "x7382" in the destination storage device 102 if the data stored in the locations specified by the two physical addresses is the same.

In some implementations, in addition to immediately copying the data from the source storage device 402 to the destination storage device 102, or instead of immediately copying the data from the source storage device 402 to the destination storage device 102, the management module 114 can copy data for specific logical addresses as the guest 104 requests data to be read from those logical addresses. Thus, copying may progress as the guest 104 issues additional read requests to the destination storage device 102 for data stored by the source storage device 402. When the guest 104 is overwriting a significant amount of data, for example, copying data in response to read requests rather than making a full copy may avoid unnecessary copying of data that is likely to be overwritten.

During stage (E), the guest 104 sends a read request 404 to the destination storage device 102 over the logical interface 110. In the example, the read request 404 is sent before migration is complete, and the destination storage device 102 does not store the data requested. The read request 404 can include a logical address of requested data, e.g., "x2536." The read request 404 may also indicate a destination address of the guest 104 in which to store the retrieved data. The guest 104 generates the read request 404 as if the guest 104 were accessing the source storage device 402. Accordingly, the guest 104 uses the same logical addresses for the read request 404 that were used with the source storage device 402, and the switch is not discernable to the guest 104.

During stage (F), in response to receiving the read request 404, the memory controller 202 identifies the logical address indicated by the read request 404 within the L2P mapping 210 of the destination storage device 102. The memory controller 202 determines that the value mapped to the identified logical address is not a valid physical address. Based on the value, the memory controller 202 determines that an event that should be issued over the event interface 120. The memory controller 202 also determines that the read operation should be halted, and so the memory controller 202 suspends or blocks the read operation. In the illustrated example, the memory controller 202 determines that for the logical address "x2536," the mapped physical address is a negative value, e.g., "xFFFF." The memory controller 202 may also determine which event or predetermined action is associated with the particular code identified.

In some implementations, the L2P mapping 210 includes status fields, separate from the physical addresses, that are associated with logical addresses. The status field can indicate a coded value. In such implementations, the memory controller 202 may evaluate the status field associated with the logical address indicated by the read request 404 to determine whether to suspend a read and/or issue an event, rather than evaluating the value in a physical address field.

During stage (G), the memory controller 202 sends a read event 408 to the management module 114 over the event interface 120 in response to detecting the code in the L2P mapping 210. In the example, the identified code corresponds to a read event, so the memory controller 202 sends a read event 408 to the management module 114. The read event 408 indicates the logical address of the read request 404. In some implementations, the read event 408 also includes the code included in the L2P mapping 210.

During stage (H), the management module 114 retrieves the data associated with the read event 408 from non-volatile storage device(s) 410 of the source storage device 402. For example, in response to receiving the read event 408, the management module 114 determines which storage device includes the requested data, and issues read commands to the source storage device 402 over a physical interface or logical interface of the source storage device 402. The source storage device 402 provides the requested data corresponding to the logical address specified by the management module, e.g., "x2536."

During stage (I), the management module 114 transmits a physical write command 414 to the destination storage device 102 over the physical interface 118. The physical write command 414 instructs the memory controller 202 to write the retrieved data from the source storage device 402 to the non-volatile storage device(s) 206 of the destination storage device 102, at a physical address determined by the management module 114. In the illustrated example, the physical write command identifies the physical address "x9648" as the address of the storage location to store the data. Although not illustrated, the write command 414 may also indicate the logical address of the destination, and/or a source address for obtaining the data to be written.

During stage (J), the memory controller 202 stores the retrieved data in the non-volatile storage device(s) 206, according to the write command 414. The memory controller 202 also updates the L2P mapping 210 to indicate the physical address of the storage locations mapped to the logical address of the read request 404. In the illustrated example, the L2P mapping 210 is updated such that the physical address of "x9648" is associated with the logical address of "x2356."

During stage (K), the memory controller 202 unblocks the read request 404 of the guest 104, and completes the read using normal procedures. The read request may be unblocked in response to, for example, the write to the logical address that triggered the read operation to be suspended, or in response to a communication from the management module 114. To complete the read operation, the memory controller 202 identifies the physical address associated with the logical address of the read request 404, obtains the data stored at the physical address indicated by the updated L2P mapping, and provides the obtained data to the guest 104.

Figure 5:
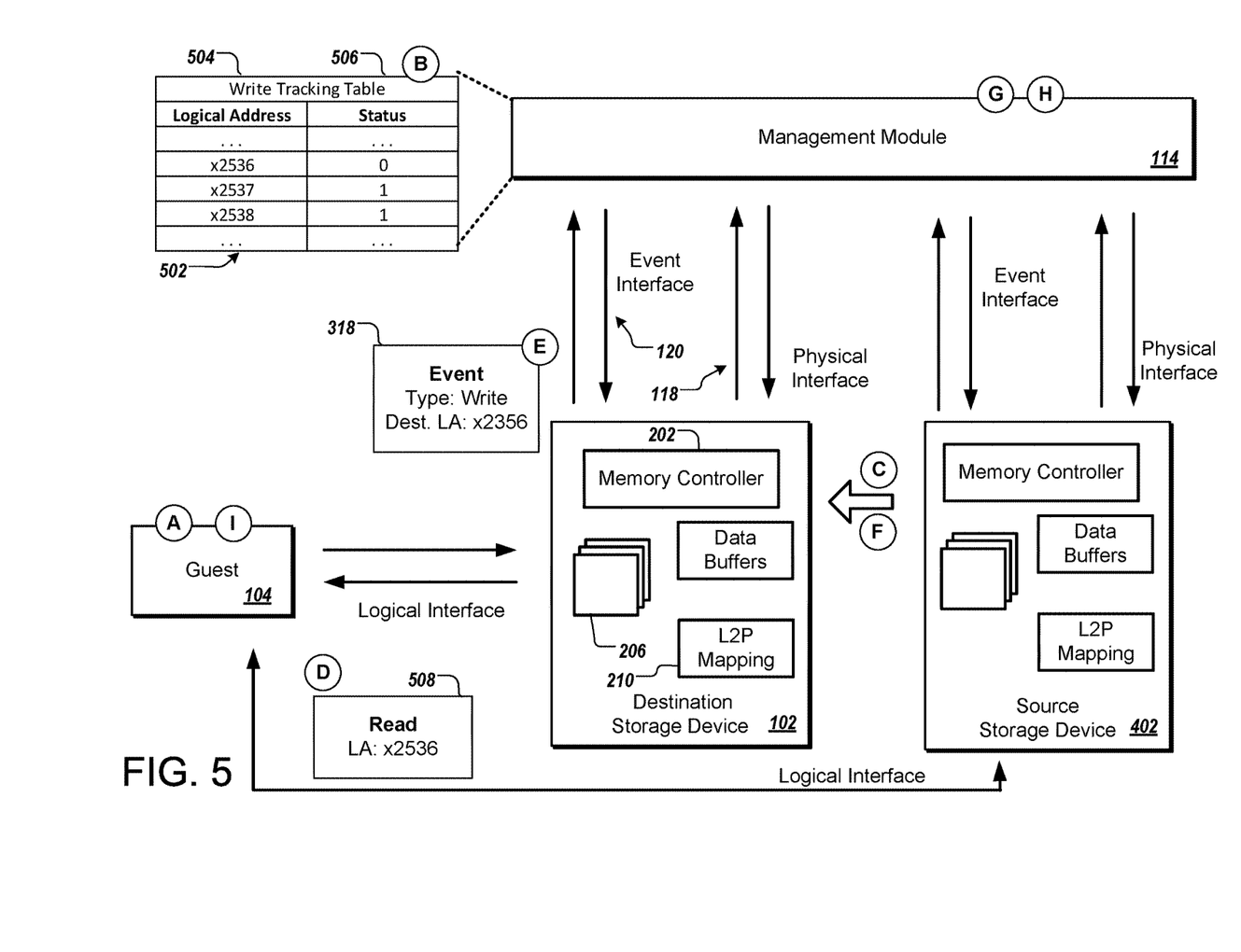

FIG. 5 is a block diagram that illustrates a system 500 for migrating data between storage devices. The system 500 includes the source storage device 402 and the storage device 102, referred to as a destination storage device 102. The source storage device 402 and the destination storage device 102 are both managed by the management module 114. The system also includes the guest 104, which initially accesses the source storage device 402. The management module 114 transitions the guest 104 from using the source storage device 402 to using the destination storage device 102, while allowing read and write access of the guest 104 during most of the migration process.

In the example of FIG. 5, the management module 114 migrates data from the source data storage device 402 to the destination data storage device 102 while maintaining the access of the guest 104 to the source data storage device 402. The transfer of the guest's 104 access from the source data storage device 402 to the destination data storage device 102 may be performed after migration is complete, e.g., after the destination storage device 102 includes a complete copy of the data on the source storage device 402. While copying is occurring, however, the guest 104 may make additional writes to the source storage device 402, causing data previously copied to the destination storage device 102 to be outdated. To address this possibility, the management module 114 tracks writes made to the source storage device 402 and also makes the same writes to the destination storage device 102. As a result, writes to the source storage device 402 are propagated to the destination storage device 102 as well.

In further detail, during stage (A), the guest 104 initially accesses the source storage device 402. The guest 104 may send read requests for data stored by the source storage device 402, receive data from the source storage device 402, and send write requests of data to be stored by the source storage device 402.

During stage (B), the management module 114 initiates migration of data stored by the source storage device 402 to the destination storage device 102. The management module 114 also initializes a transition table 502, which is stored at the host 108, that allows the management module 114 to track which logical addresses the guest 104 writes to after the migration of data begins. The transition table 502 may include, for example, a first column 504 that includes logical addresses and a second column 506 that indicates a status of whether the destination storage device 102 currently stores the current data associated with the corresponding logical address. In the illustrated example, a status value of "0" can indicate that the data at the corresponding logical address is current at the destination storage device 102. A status of "1" can indicate that the data at the corresponding logical address is not current on the destination storage device 102, e.g., the guest 104 has written data to the logical address at the source storage device 402 that has not been transferred to the destination storage device 102, or the data has not yet been copied from the source storage device 402. In some implementations, at the beginning of migration, the management module 114 initializes the transition table 502 to indicate that data is outdated at the destination storage device 102 for all logical addresses, e.g., all logical addresses would have a status value of "1" in the example.

During stage (C), the management module 114 migrates data from the source storage device 402 to the destination storage device 102. As the management module 114 copies the data from the source storage device 402 to the destination storage device 102, the management module 114 updates the transition table 502 to indicate that the copied data is valid on the destination storage device 102. For example, after copying the data corresponding to logical address "x2356" from the source storage device 402 to the destination storage device 102, the status value corresponding to the logical address "x2356" is updated to "0" to indicate that the associated data is current.

During stage (D), the guest 104 continues to access the source storage device 402 during the migration process. The guest 104 can provide a read request 508 to the source storage device 402, and the data indicated by the read request 508 is provided by the source storage device 402. That is, read operations do not affect the destination storage device 102, or the migration process.

During stage (E), the guest 104 sends a write request (not shown) to the source storage device 402, as described above with respect to FIG. 3. The write operation is made to the source storage device 402 as discussed with respect to FIG. 3. In addition, in response to the write event that the source storage device 402 provides, the management module 114 updates the transition table 502. In particular, since the source storage device 402 is in the process of being migrated, the management module 114 updates the status value associated with the logical address of the write as not being current on the destination storage device 102, e.g., a status value of "1." This indicates that the write request by the guest 104 supersedes any data that may have been previously copied for the logical address of the write request, even if the data corresponding to the logical address had been current at the destination storage device at one time.

During stage (F), the management module 114 continues the migration of data from the source storage device 402 to the destination storage device 102. For example, the management module 114 continues to issue read commands to the source storage device 402 and write commands to the destination storage device 102 to copy data for all logical that are have a value of "1" in the status value table. After data corresponding to a logical address is copied, the status value is updated to "0" to indicate that the current data resides on the destination storage device 102.

During stage (G), the management module 114 determines that the migration of data from the source storage device 402 to the destination storage device 102 is complete. For example, the management module 114 examines the transition table 502 and determines that each of the logical addresses, or at least predetermined amount of the logical addresses, have a status value of "0" in the transition table 502.

During stage (H), the management module 114 provides the guest 104 with access to the destination storage device 102. For example, the management module 114 may briefly stop the virtual environment for the guest 104 and then resume the virtual environment after substituting access to the destination storage device 102 for access to the source storage device 402. Because the data on the source storage device 402 has been transferred to the destination storage device 102, the source storage device 402 may be erased or used for another purpose.

During stage (I), the guest 104 accesses the destination storage device 102. The guest 104 is unaware of the switch of access from the source storage device 402 to the destination storage device 102. That is, the change does not affect read and write access by the guest 104, and generally is not discernible to the guest 104.

The migration techniques described with respect to FIGS. 4 and 5 may be combined. For example, migration may be initiated with one of the techniques, and may be completed with the other technique. Similarly, invalid physical addresses or other codes may be used in a L2P mapping to avoid reads of invalid data, and a management module 114 may also use a transition table or other mechanism to track writes to be applied to one or more storage devices.

The migration technique discussed with respect to FIG. 5 may be more efficient in scenarios where the guest 104 is primarily reading data. When the guest 104 workload is focused on read operations, each piece of data may be copied to the destination storage device 102 once, since the guest 104 is not writing new versions and the data copied to the destination does not become out of date. In addition, read operations may be performed quickly because guest 104 is still in communication with the source storage device 402, which includes all of the current data that the guest 104 may wish to access.

The migration technique of FIG. 4 may be more efficient when the guest 104 is writing large amounts of data. Large amounts of writes may slow migration using the technique of FIG. 5, because previously data from previously copied locations may need to be re-copied to the destination storage device 102 as new data is written to the source storage device 402. If the host 108 is not able to copy data to the destination drive faster than the guest 104 is writing new data to the source storage device 402, the migration process may proceed slowly or stall. The host 108 may evaluate the amount or frequency of write requests by the guest 104 or the speed that migration is progressing. From this evaluation the host 108 may determine to transition to from the migration technique of FIG. 5 to the technique of FIG. 4, allowing access to the source storage device 402 to be suspended before a complete copy is made. By using to the technique of FIG. 5, access may be transferred to the destination storage device 102, so that the writes are made directly to the destination storage device 102 instead of first being made to the source storage device 402. In a write-heavy workload, the need to read data from the source storage device 402 will be relatively rare, since the guest 102 is primarily generating new data.

Figure 6:
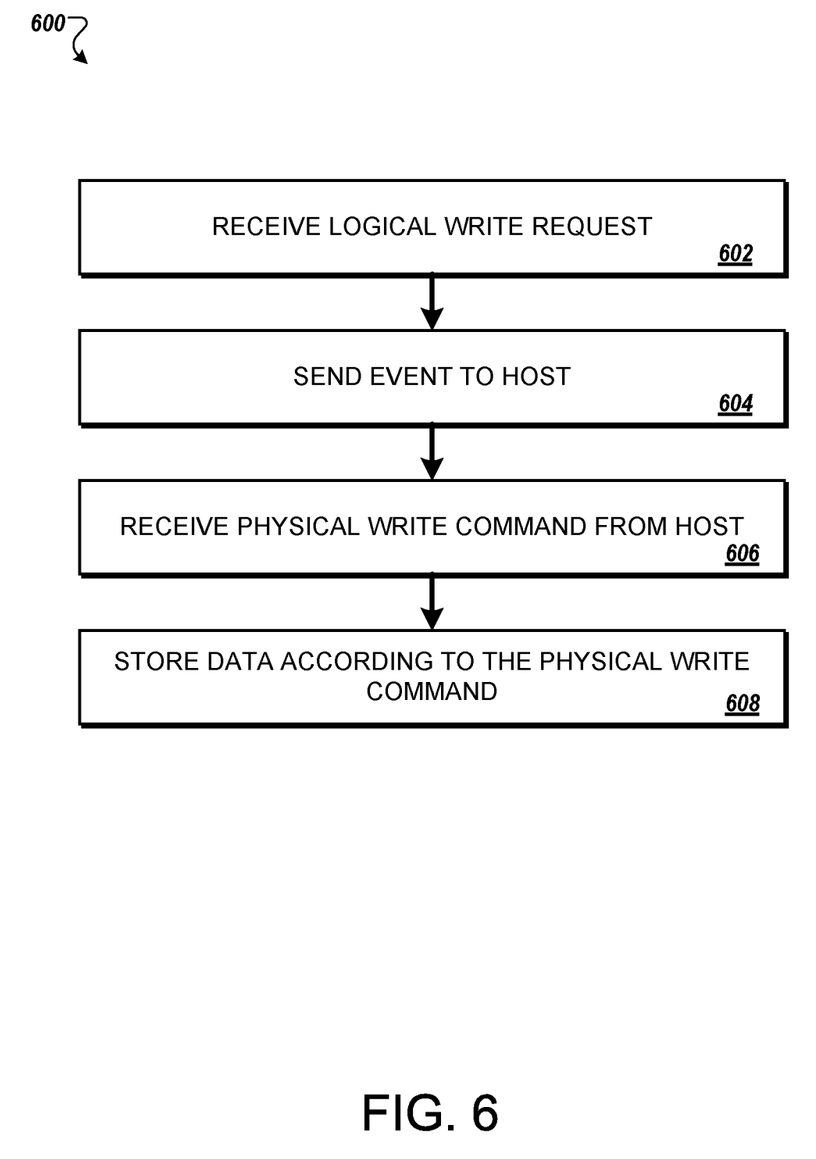
FIG. 6 illustrates a flow diagram that illustrates an example of managing storage devices.

FIG. 6 depicts a flow diagram that illustrates an example of a process 600 for managing storage devices. The process 600 can be executed using one or more processing devices. For example, the memory controller 202 of the storage device 102 or another processor may perform the operations of the process 600.

A logical write request is received by a memory controller over a logical interface (602). The memory controller provides the logical interface for accessing a non-volatile storage device. The logical write request indicates a logical address at which to write data to the non-volatile storage device. The logical write request may be received over a NVMe interface or an MCI interface.

In some implementations, the data to be written is received through a direct memory access (DMA) transfer. The data may be received from, for example, an application or virtualized operating system, or other system other than the host system that manages the storage device including the memory controller.

In response to receiving the logical write request, the memory controller may allocate a write buffer for storing the data. For example, a write buffer may be allocated in volatile memory, such as DRAM. The memory controller may then store the data in the allocated write buffer. In some implementations, an acknowledgement of the write indicated by the logical write request is provided after storing the data in the allocated write buffer and before storing the data in the non-volatile storage devices.

A write request event is sent by the memory controller to a host system (604). The write request may be sent in response to receiving the logical write request by the memory controller. In some implementations, the write request event indicates (i) a buffer address for a write buffer storing the data to be written and (ii) the logical address indicated by the logical write request the write request event may be sent to the host system without sending the data to be written to the host system.

A physical write command is received at the memory controller from the host system over a physical interface (606). The memory controller provides the physical interface for accessing the non-volatile storage device. The physical write command instructs the memory controller to write the data to the non-volatile storage device. In some implementations, the physical write command indicates (i) the write buffer address for the write buffer storing the data and (ii) one or more physical pages of the non-volatile storage device in which to store the data to be written. For example, the physical write command may indicate physical NAND flash pages in which to write the data. The physical write command may be received by the memory controller without receiving the data to be written from the host system. The physical write command may be received over a PCI-e interface.

The data is stored by the memory controller according to the physical write command (608). The data is stored in response receiving the physical write command from the host system. When the physical write command indicates specific physical pages of the non-volatile storage device, e.g., with corresponding physical addresses, the data may be stored in the specified physical pages. After storing the data in the non-volatile storage device, the memory controller may deallocate a write buffer storing the data that was written.

After storing the data in the non-volatile storage device, the memory controller may update the logical-to-physical mapping table managed by the memory controller. For example, the logical address indicated in the logical write request may be mapped to the physical address indicated by the physical write command from the host system. An acknowledgment of the write indicated by the logical write request may also be provided after storing the data in the non-volatile storage device.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method comprising:
    storing, in memory of a first data storage device, a logical-to-physical mapping that indicates a mapping of logical addresses to physical addresses of the first data storage device;
    as data is migrated from a second data storage device to the first data storage device, storing, in the memory of the first data storage device, values indicating logical addresses for which the first data storage device does not store valid data;
    receiving, by the first data storage device, write commands from a host system configured to manage the first data storage device, wherein the write commands instruct copying of data from the second data storage device to storage locations of the first data storage device that are selected by the host system, wherein the write commands specify the storage locations using physical addresses of the first data storage device;
    before the data of the second data storage device is fully migrated to the first data storage device, receiving, by the first data storage device, a read request from a guest system that requests data corresponding to a logical address indicated by the read request;
    determining, by the first data storage device and based on the values stored in memory of the first data storage device, that the first data storage device does not store the data corresponding to the logical address indicated by the read request;
    in response to determining that the first data storage device does not store the data corresponding to the logical address indicated by the read request, suspending a read operation at the first data storage device corresponding to the read request, generating an event, and sending the event to the host system;
    receiving a write command that the host system issued in response to the event, the write command instructing a write corresponding to the logical address indicated by the read request;
    in response to receiving the write command from the host system:
        writing the data indicated by the write command;
        removing, from the values, a corresponding value indicating that the first data storage device did not store valid data for the logical address indicated by the read request; and
        updating the logical-to-physical mapping to indicate the physical address for the logical address indicated by the read request; and
    resuming the read operation at the first data storage device and providing, to the guest system, the data corresponding to the logical address indicated by the read request.

2. The method of claim 1, wherein storing the values indicating logical addresses for which the first data storage device does not store valid data comprises:
    storing, in the logical-to-physical mapping, one or more codes that designate that the logical addresses as invalid for the first data storage device.

3. The method of claim 1, wherein storing the values indicating logical addresses for which the first data storage device does not store valid data comprises:

storing, in the logical-to-physical mapping, one or more invalid physical addresses to designate specific logical addresses as invalid for the first data storage device.

4. The method of claim 1, further comprising:
before the data of the second data storage device is fully migrated to the first data storage device, receiving, by the first data storage device, a second read request from the guest system that requests data corresponding to a second logical address indicated by the second read request;
determining, by the first data storage device, that the first data storage device stores the data corresponding to the second logical address indicated by the second read request; and
in response to determining that the first data storage device stores the data corresponding to the second logical address indicated by the second read request, providing data stored by the first data storage device to the guest system in response to the second read request.

5. The method of claim 1,
wherein the event indicates the read request to the host system.

6. The method of claim 5, wherein the event indicates the logical address associated with the read request from the guest system.

7. The method of claim 1, wherein the values are status flags indicating that the first data storage device does not store valid data corresponding to the logical addresses associated with the status flags.

8. The method of claim 1, comprising, before receiving write commands to copy data from a second data storage device to the first data storage device as part of migrating contents of a second data storage device to the first data storage device, assigning, to each logical address in the logical-to-physical mapping, a predetermined code indicating that the logical address does not correspond to valid data.

9. The method of claim 1, wherein the first data storage device is a flash memory drive, and wherein receiving the read request comprises receiving the read request over a non-volatile memory express (NVMe) interface or an advanced host controller interface (AHCI) interface.

10. The method of claim 1, wherein the first data storage device is a data storage drive that provides (i) a first interface to the host system that enables the host system to perform physical addressing for the data storage drive and (ii) a second interface to the host system that enables the host system to perform logical addressing for the data storage drive.

11. The method of claim 1, wherein the logical-to-physical mapping includes the values indicating logical addresses for which the first data storage device does not store valid data; and
wherein updating the one or more of the stored values comprises updating, by the first storage device, the logical-to-physical mapping based on the received write commands to indicate that the first data storage device stores valid data for the one or more logical addresses corresponding to the received write commands.

12. A data storage device comprising:
memory;
one or more non-volatile storage devices; and
a memory controller configured to:
store, in the memory, a logical-to-physical mapping that indicates a mapping of logical addresses to physical addresses of the one or more non-volatile storage devices;
store, in the memory and while data is migrated to one or more non-volatile storage devices of the data storage device from a second data storage device, values indicating logical addresses for which the one or more non-volatile storage devices do not store valid data;
receive write commands from a host system configured to manage the one or more non-volatile storage devices, wherein the write commands instruct copying of data from the second data storage device to storage locations of the one or more non-volatile storage devices that are selected by the host system, wherein the write commands specify the storage locations using physical addresses of the one or more non-volatile storage devices;
receive, before the data of the second data storage device is fully migrated to the one or more non-volatile storage devices, a read request from a guest system that requests data corresponding to a logical address indicated by the read request;
determine, based on the values stored in memory, that the one or more non-volatile storage devices do not store the data corresponding to the logical address indicated by the read request;
in response to determining that the one or more non-volatile storage devices do not store the data corresponding to the logical address indicated by the read request, suspend a read operation at the one or more non-volatile storage devices corresponding to the read request, generating an event, and sending the event to the host system;
receive a write command that the host system issued in response to the event, the write command instructing a write corresponding to the logical address indicated by the read request;
in response to receiving the write command from the host system:
write the data indicated by the write command;
remove, from the values, a corresponding value indicating that the one or more non-volatile storage devices did not store valid data for the logical address indicated by the read request; and
update the logical-to-physical mapping to indicate the physical address for the logical address indicated by the read request; and
resume the read operation at the one or more non-volatile storage devices and providing, to the guest system, the data corresponding to the logical address indicated by the read request.

13. The data storage device of claim 12, wherein to store the values indicating logical addresses for which the one or more non-volatile storage devices do not store valid data, the memory controller is configured to:
store, in the logical-to-physical mapping, one or more codes that designate that the logical addresses as invalid for the data storage device.

14. The data storage device of claim 12, wherein to store the values indicating logical addresses for which the one or more non-volatile storage devices do not store valid data, the memory controller is configured to:
store, in the logical-to-physical mapping, one or more invalid physical addresses to designate specific logical addresses as invalid for the data storage device.

15. The data storage device of claim 12, wherein the data storage device is a solid-state drive.

16. The data storage device of claim 12, wherein the memory controller is configured to rely on the host system to perform at least one of garbage collection, wear leveling, or selection of physical areas to write data.

17. A non-transitory machine-readable storage device storing instructions that, when executed by one or more processors, cause the one or more processors to perform operations comprising:

storing, in memory of a first data storage device, a logical-to-physical mapping that indicates a mapping of logical addresses to physical addresses of the first data storage device;

as data is migrated from a second data storage device to the first data storage device, storing, in the memory of the first data storage device, values indicating logical addresses for which the first data storage device does not store valid data;

receiving, by the first data storage device, write commands from a host system configured to manage the first data storage device, wherein the write commands instruct copying of data from the second data storage device to storage locations of the first data storage device that are selected by the host system, wherein the write commands specify the storage locations using physical addresses of the first data storage device;

before the data of the second data storage device is fully migrated to the first data storage device, receiving, by the first data storage device, a read request from a guest system that requests data corresponding to a logical address indicated by the read request;

determining, by the first data storage device and based on the values stored in memory of the first data storage device, that the first data storage device does not store the data corresponding to the logical address indicated by the read request;

in response to determining that the first data storage device does not store the data corresponding to the logical address indicated by the read request, suspending a read operation at the first data storage device corresponding to the read request generating an event, and sending the event to the host system;

receiving a write command that the host system issued in response to the event, the write command instructing a write corresponding to the logical address indicated by the read request;

in response to receiving the write command from the host system:
  writing the data indicated by the write command;
  removing, from the values, a corresponding value indicating that the first data storage device did not store valid data for the logical address indicated by the read request; and
  updating the logical-to-physical mapping to indicate the physical address for the logical address indicated by the read request; and resuming the read operation at the first data storage device and providing, to the guest system, the data corresponding to the logical address indicated by the read request.

* * * * *